United States Patent [19]
Robinson

[11] Patent Number: 6,097,385
[45] Date of Patent: *Aug. 1, 2000

[54] COMPUTER RESOURCE REGULATION

[75] Inventor: Tony L. Robinson, Palo Alto, Calif.

[73] Assignee: Compaq Computer Corporation, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/724,682

[22] Filed: Oct. 3, 1996

Related U.S. Application Data

[63] Continuation of application No. 08/339,840, Nov. 15, 1994, abandoned.

[51] Int. Cl.[7] .................................................. G06F 3/00
[52] U.S. Cl. ...................... 345/333; 340/825.34; 380/23; 380/25
[58] Field of Search .................................. 345/112, 119, 345/333, 334, 145, 163, 168; 395/333, 334, 335, 186, 188.01; 340/825.31, 825.34, 825.36; 348/552; 235/382; 380/23, 25; 361/683

[56] References Cited

U.S. PATENT DOCUMENTS

| | | | |
|---|---|---|---|
| 5,077,795 | 12/1991 | Rourke et al. | 380/55 |
| 5,357,573 | 10/1994 | Walters | 380/25 |
| 5,418,549 | 5/1995 | Anderson et al. | 345/145 |
| 5,457,479 | 10/1995 | Cheng | 345/163 |

FOREIGN PATENT DOCUMENTS

| | | |
|---|---|---|
| 2104088 | 2/1994 | Canada . |
| WO 91/01065 | 1/1991 | WIPO . |
| WO 94/10773 | 5/1994 | WIPO . |

OTHER PUBLICATIONS

IBM Technical Disclosure Bulletin, "Dynamic Time–Dependent User Interface Modification", vol. 37, No. 1, Jan. 1994, pp. 287–290.

*Primary Examiner*—Kent Chang
*Attorney, Agent, or Firm*—Conley, Rose & Tayon, P.C.

[57] ABSTRACT

In general, in one aspect, the invention features a system for operating the computer in any of at least two different interactive modes, along with a switch having at least two states. An access control device allows a user to change the state of the switch, for changing which interactive mode is currently active.

14 Claims, 6 Drawing Sheets

Boot Sequence

Operation Sequence

Fig. 5 Operation Sequence

Fig. 4 Boot Sequence

COMPUTER RESOURCE REGULATION

This is a continuation of application Ser. No. 08/339,840, filed Nov. 15, 1994, now abandoned.

BACKGROUND

This invention relates to computer resource regulation. For example, when a child and an adult share the same computer, the child sometimes accidentally (or deliberately) accesses and misuses (even ruins) programs and data belonging to the adult. One way to regulate the child's use is to password protect the adult's files. The adult must enter the password via the keyboard each time he wants to use one of the files. The child may overcome even such password protection, unintentionally or deliberately. Another way to regulate the child's use is to provide a special child's interactive environment, different from the normal adult environment. The adult can switch back and forth between the two by entering a password or a special key combination. In a commercial context, it may also be useful to provide different interactive environments for different adult users of a single computer.

SUMMARY

In general, in one aspect, the invention features a system for operating the computer in any of at least two different interactive modes, along with a switch having at least two states. An access control device allows a user to change the state of the switch, for changing which interactive mode is currently active.

Implementations of the invention may include the following features. The access control device may comprise a mechanical key-operated lock and a key, a dedicated input device for entering a security code, a magnetic stripe reader, a token reader and a set of tokens that can be read by the reader, each token being associated with one of the modes, or a PCMCIA card input device and PCMCIA card. The two different interactive modes may comprise two different graphical user interfaces that include graphical elements representing two different sets of applications. One of the graphical user interfaces may be configured for use by a child and the other graphical user interface may be configured for use by an adult. The system may be configured such that the user cannot change the active mode except by changing the state of the switch. The system may allow for more than two different interactive modes, where the switch allows a user to cause any of the modes to be active.

The switch may comprise an electromechanical switch having at least two positions and computer circuitry which periodically detects the current position of the electromechanical switch and provides an interrupt signal to a microprocessor of the computer when a change of switch position is detected. The switch may comprise an electromechanical switch that has at least two positions, and instructions in the computer boot sequence which, during boot-up, detect the current position of the electromechanical switch and trigger a corresponding one of at least two different boot-up routines depending upon the current position of the switch.

The system for operating the computer may comprise a windowed operating system in which available applications are represented by displayed icons, with the two different interactive modes represented by two different sets of displayed icons. In addition, the switch and access control device may be housed in a unit that connects to a communication port of the computer.

In general, in another aspect, the invention features a method for regulating use of a personal computer. The personal computer is able to be operated in any of at least two different interactive modes, whereby only an authorized user is given secured access to change the state of a mode switch, and the interactive mode changes in response to a change in the state of the mode switch.

Implementations of the invention may include the following features. Changing the interactive mode may display a different graphical user interface that includes graphical elements representing available applications. The system may be configured such that the user cannot change the interactive mode except by changing the state of the mode switch. The interactive mode may be changed by periodically detecting the current state of the mode switch, or providing an interrupt signal to a microprocessor of the computer when the current state has changed. Or the interactive mode may be changed by detecting the current state of the mode switch, and triggering a corresponding one of at least two different boot-up routines depending upon the current state of the switch.

Among the advantages of the invention are the following. The computer resource security system may allow easy switching between a resource-rich adult environment and a limited-resource child environment. The child environment can prevent accidental harm to files and programs, and may be configured to lead a child through a series of exercises or games. Use of key switches or other similar physical access devices eliminates the need to remember easily forgotten passwords, and these physical devices immediately instruct a supervising adult about the state of the computer. Furthermore, a child cannot simply reboot the machine, or decode a password, to gain access to the adult resources, and the computer environment can be changed even when the computer is not operating. Sophisticated sets of keys or tokens may be used to change the computer system to a number of different states, allowing different users access to different complements of programs and resources. PCMCIA cards containing non-volatile memory can store the last state of the machine for a given user, allowing immediate re-entry into a given program.

Other advantages and features of the invention will become apparent from the following description and from the claims.

DESCRIPTION

Figure 1A:
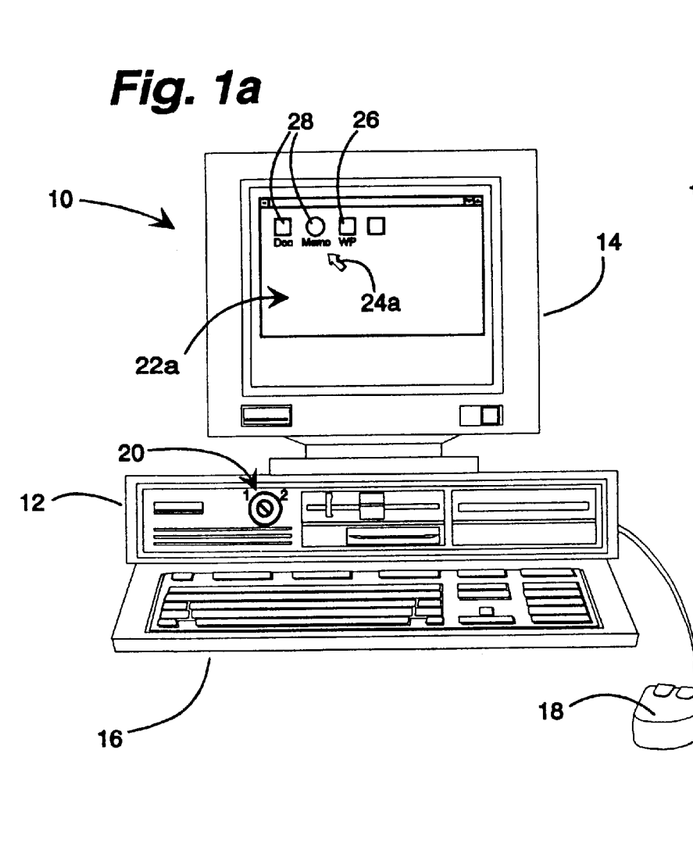
FIGS. 1a and 1b are representations of a personal computer configured to display adult and child graphical environments.
Figure 1B:
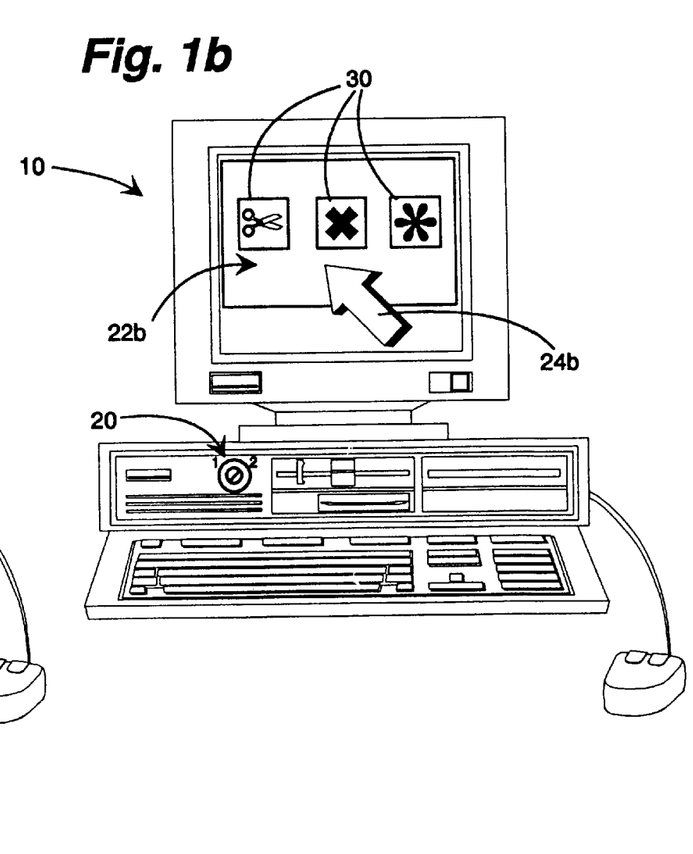

Referring to FIGS. 1a and 1b, a personal computer 10 has a key switch 20 having a position "1" (FIG. 1a), where the computer 10 displays a conventional full-ccess computer interface 22a (for example, the Program Manager™ provide by Microsoft® Windows™) for use by an adult, and a position "2" (FIG. 1b), where the computer displays an interface 22b appropriate, e.g., for a child. Switching between interfaces is rapidly accomplished by inserting a key into switch 20, since switch 20 is a key operated device with electrical contacts.

The particular windowed "adult" environment 22a displayed on monitor 14 allows a small graphical cursor 24a to access any number of programs 26 and documents or files 28 ("applications"), through keyboard 16 and mouse input device 18. An exemplary child environment 22b might provide a larger cursor 24b that can access only preset programs and commands 30 (also "applications"). The child would be prevented from accessing the full range of programs and data files available in the adult environment 22a. Thus, the child would not be able generally to access all the computer files, nor could the child open, copy, move or delete such program and data files. A child environment focuses children's attention onto program materials appropriate for their age, and assures adults that the child cannot disrupt the computer's other uses.

The use of the switch 20 to effect these protections has several advantages. The adult user does not have to remember easily forgotten passwords. Such passwords are also easily discovered by curious children who peek when asked not to. The adult need only keep a single key to regulate access to the computer. In addition, the use of a physical key immediately instructs the adult user of the state of the machine: if the switch is in position 2, it is safe for child use. Furthermore, the access regulation provided by the present invention works at all times. A child cannot simply reboot the system to gain access to the adult environment: so long as the key switch is in the second position, the computer will only provide access to the child environment. The physical switch and thereby the current environment can be changed even when the computer is not running.

Figure 2:
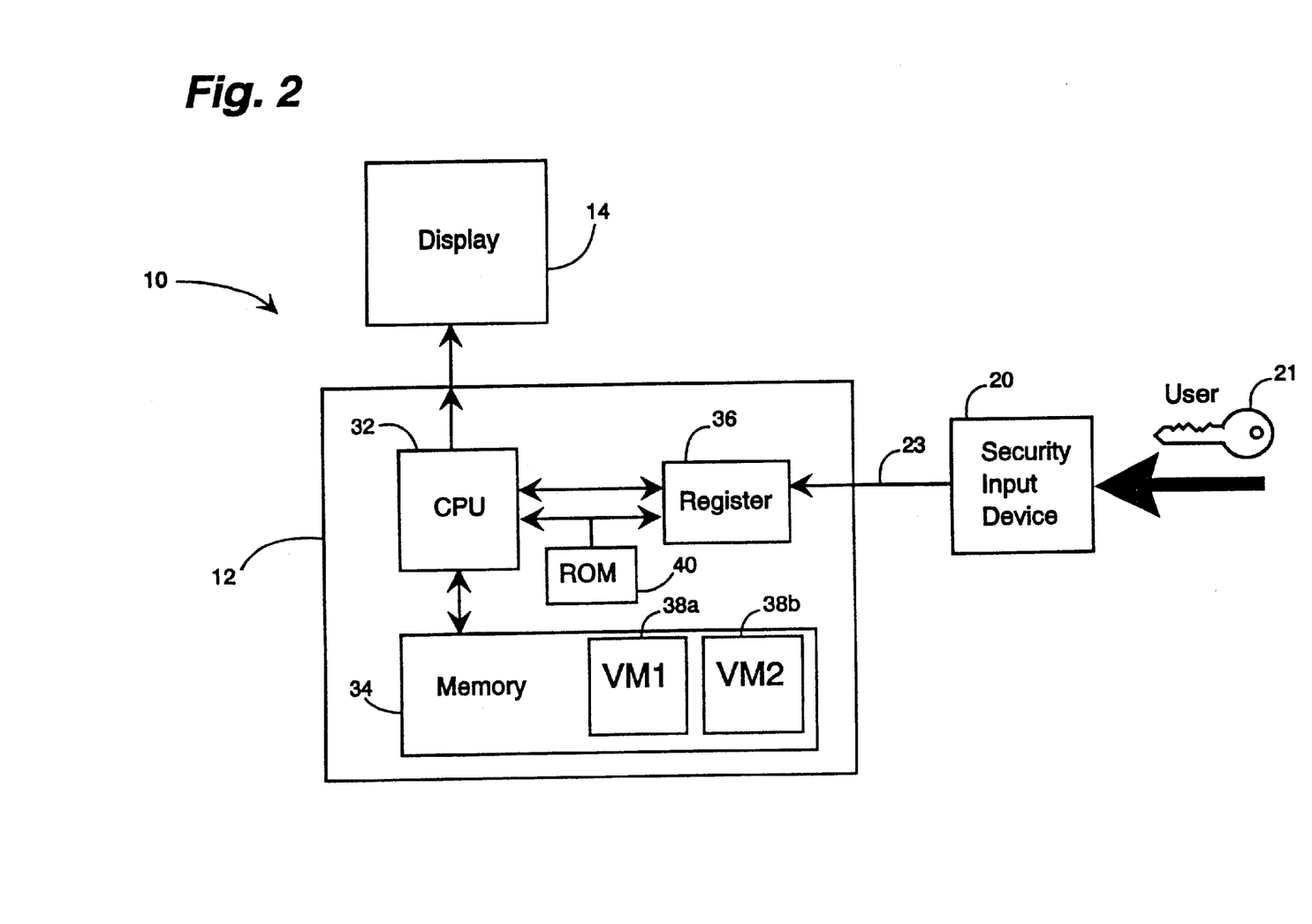
FIG. 2 is a schematic diagram of a computer resource regulation system.

Referring to FIG. 2, when a computer user activates the security input device 20 (for example, by inserting key 21 into a key switch 20), this sends a state signal 23 that changes the state of the input register 36. The state of input register 36 may be as simple as a single binary digit: 0 for adult, 1 for child. For speed, the two separate adult and child environments would be present in RAM 34 as two memory areas representing two virtual machines, VM1 and VM2 (38a and 38b respectively).

Figure 3:
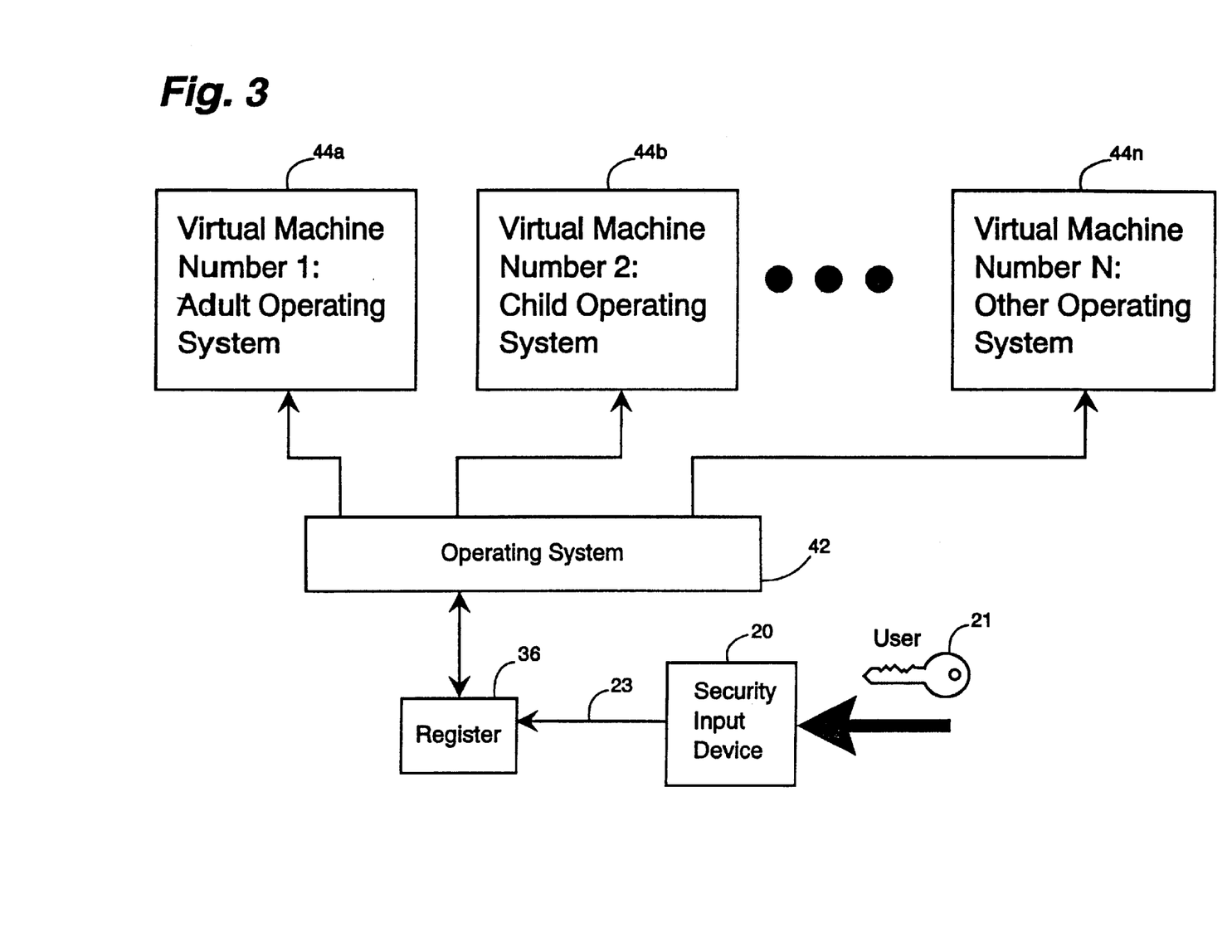
FIG. 3 is a schematic diagram of a computer resource regulation system having N switchable virtual machine environments.

The switching between virtual machines is shown in FIG. 3, where a first operating system program layer 42 periodically tests the value of register 36 to determine which virtual machine to make active. For example, virtual machine 44a (contained in memory area 38a) might be initially active, while the adult operates the computer. Virtual machine 44a could be a full-fledged Windows™ system, allowing complete access to all programs and files in a graphical user interface. When the adult user inserts a key 21 or otherwise accesses the security input device 20, changing the state of register 36, the operating system 42 changes the currently running virtual machine to virtual machine 44b (contained in memory area 38b). The computer then displays a limited graphical interface suited to a child at a particular age level, an interface that disallows accessing and changing important (but for the child unessential) files.

The system may be generalized to provide N virtual machines $44_N$. For example, the key switch used for the security input device 20 can have a number of positions, one for each user of the computer. The state of register 36 would then reflect which user's virtual machine should be active.

Each child could have an environment tailored to his or her own age. In more elaborate implementations, each virtual machine would remember where each child had left off. If a child was in the midst of a particular lesson while the adult had to take over the computer, a simple turn of the key switch 20 would place the particular child to the place last left, while securing the computer from any harm. Other children would have their own placemarks retained. In another use, the adult could preconfigure the child environment to start with a certain lesson whenever the child next uses the computer.

This security system finds applications in work environments as well, where different computer users are allowed access to different computer resources. For example, a payroll executive would be allowed access to all of the system files (analogous to the adult environment of virtual machine 44a), while, with the turn of a switch, her secretary would be allowed to access only a restricted set of materials (analogous to the child environment of virtual machine 44b), and not discover files relating to co-worker salaries.

Figure 4:
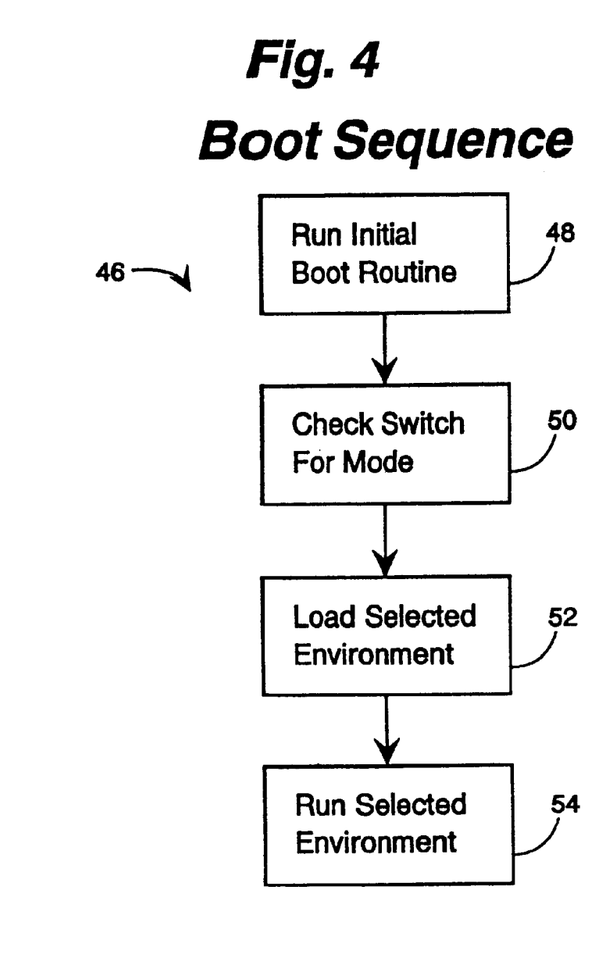
FIG. 4 is a flow chart of a boot sequence for loading a selected computer environment.
Figure 5:
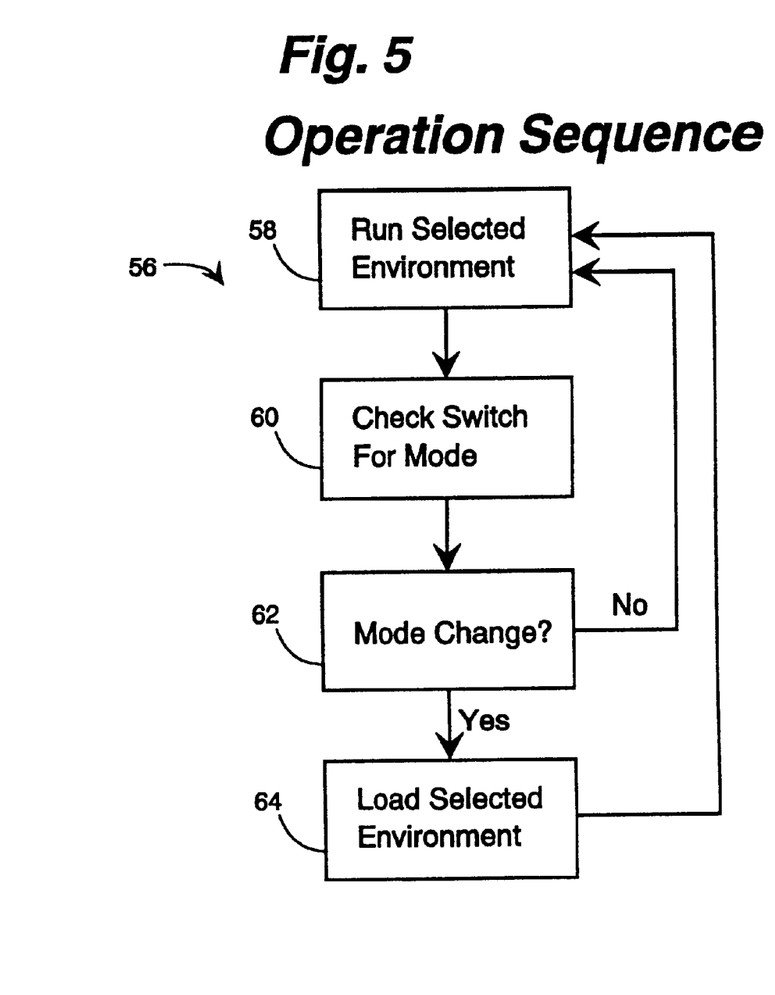
FIG. 5 is a flow chart of an operation sequence for loading a selected computer environment.

Referring to FIGS. 4 and 5, during boot-up 46, an initial conventional boot routine 48 is run. Typically, such routines are contained in the boot ROM 40 on the motherboard of the personal computer 10. After the initial boot routine, the register 36 is checked 50 to find the current switch state. Based upon the state of register 36, the appropriate environment is loaded 52, initially from a non-volatile memory source such as an electromagnetic or optical disk drive. Once loaded, the selected environment (for example, the child environment) is then run 54.

After boot-up, and during normal operation, the sequence 56 shown in FIG. 5 is employed. The currently selected environment is allowed to run 58. At preselected intervals, register 36 is checked 60 for its current state. The current register state is compared 62 with its last state. If the security input device 20 has been changed (for example, the adult has inserted her key and moved it to the adult position), the system loads 64 the new selected environment and runs 58 this new environment. The new environment may have already been run before during the session, in which case it might be conveniently accessed from RAM as a virtual machine. Otherwise, the new environment will also need to be loaded from a non-volatile memory source. If the security input device 20 has not been changed, the current environment is simply allowed to continue running 58, until the next time the switch register is checked 60.

Figure 6:
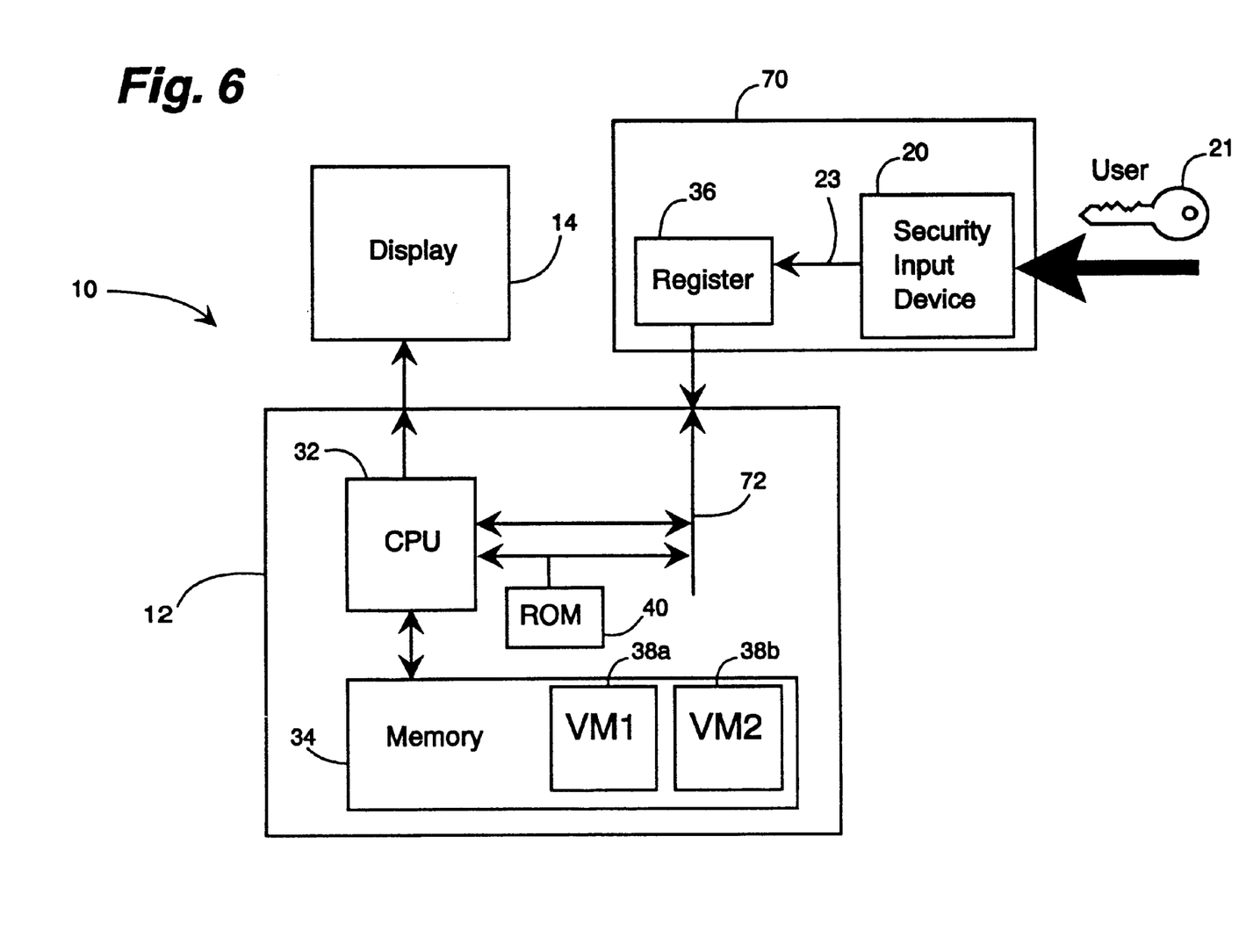
FIG. 6 is a schematic diagram of a computer resource regulation system connected through a communications port.

Other embodiments are within the scope of the following claims. Different "adult" and "child" operating systems may be employed, e.g., Macintosh, UNIX and other sophisticated operating systems could be swapped with respective limited versions. Register 36 may be hardwired onto the computer motherboard, placed on an add-on board to existing computers, incorporated into the security input device 20, or created in RAM 34 during computer operation. The security input device with or without the register, might be attached to the computer as a unit 70 (as in FIG. 6) through an already existing communications port 72. Instead of periodically interrogating register 36 to determine if its state has changed, an interrupt signal may be immediately dispatched to the operating system to change the operating environment. Furthermore, other procedures for loading, running and unloading each operating environment may be used.

Figure 7A:
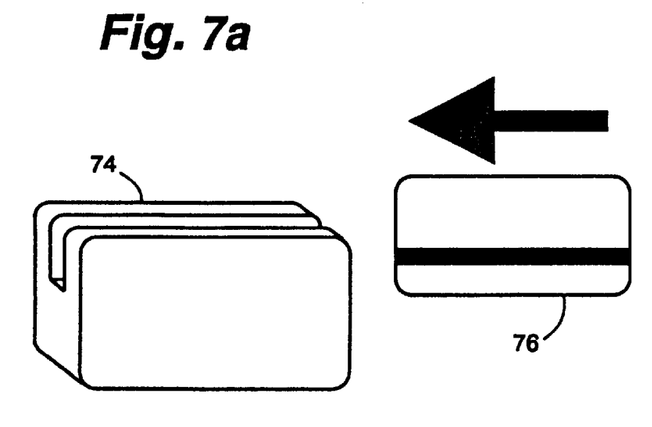
FIGS. 7a, 7b, 7c and 7d are representations of alternative security input devices.
Figure 7B:
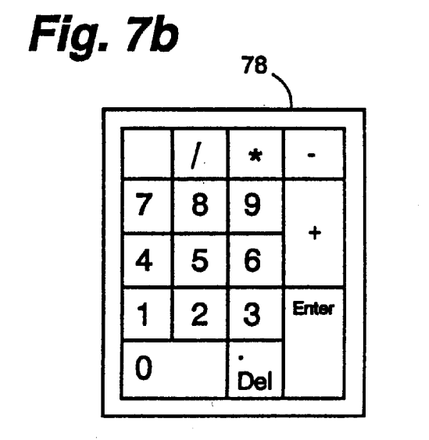
Figure 7C:
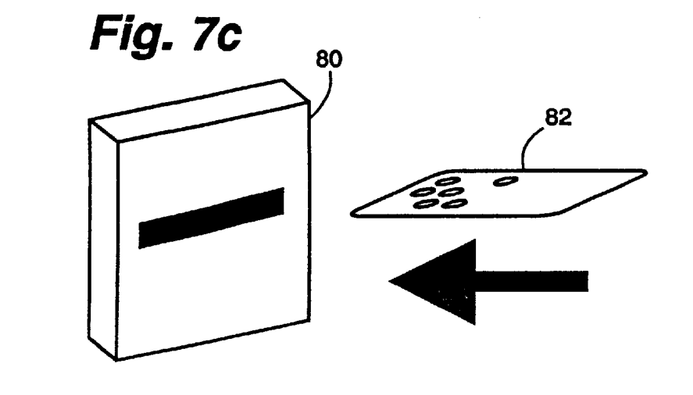
Figure 7D:
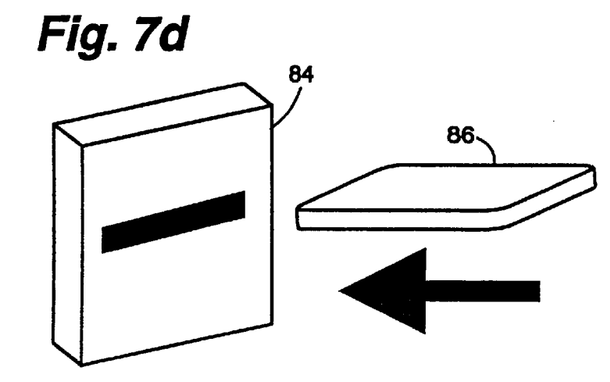

Other security input devices may be used, such as a mechanical key-operated lock using a set of different keys 21, one for each user of the computer. Each key would encode the system with the key owner's identity, and set the appropriate environment. Or a magnetically-striped card reader 74 (FIG. 7a) may be used: again, each user would have a unique card 76 for his identity and respective environment. A dedicated separate alphanumeric code pad 78 (FIG. 7b) might also be used to input a code to change the state of the computer. A set of hole-punched keys 82 (FIG. 7c), or tokens, might be issued to each computer user, with the security input device comprising a hole-punch key reader 80. Or the security input device might comprise a PCMCIA slot 84 (FIG. 7d) or the like. Each user would be issued a coded PCMCIA card 86 to unlock and use the computer. Each PCMCIA security card 86 might also provide long-term storage memory for the state of the computer when the user last worked on it. For those security input devices that do not mechanically remain in the same state during computer shut-down or rebooting, provision may be made to retain the current environment state in register 36, through, e.g., a low-level maintenance current.

What is claimed is:

1. Apparatus for regulating use of a computer comprising
    a system for operating the computer in any of at least two different interactive modes,
    a switch having at last two states, each of the states, when enabled, causing one of the modes to be active, and
    an access control device for allowing a user to change the state of the switch.

2. The apparatus of claim 1 wherein the access control device comprises a mechanical key-operated lock and a key.

3. The apparatus of claim 1 wherein the access control device comprises a dedicated input device for entering a security code.

4. The apparatus of claim 1 wherein the access control device comprises a magnetic stripe reader.

5. The apparatus of claim 1 wherein the access control device comprises a token reader and a set of tokens that can be read by the reader, each token being associated with one of the modes.

6. The apparatus of claim 1 wherein the access control device comprises a PCMCIA card input device and at least one PCMCIA card that can be read by the PCMCIA card input device, each PCMCIA card being associated with one of the modes.

7. The apparatus of claim 1 wherein one of the graphical user interfaces is configured for use by a child and the other of the graphical user interfaces is configured for use by an adult.

8. The apparatus of claim 1 wherein the user cannot change the active mode except by changing the state of the switch device.

9. The apparatus of claim 1 wherein there are more than two different interactive modes and wherein the switch device allows a user to cause any of the modes to be active.

10. The apparatus of claim 1 wherein the switch device comprises
    an electromechanical switch device having at least two positions, and
    computer circuitry which periodically detects the current position of the electromechanical switch device and signals the microprocessor of the computer when a change of switch device position is detected.

11. The apparatus of claim 1 wherein the switch device comprises
    an electromechanical switch device having at least two positions, and
    computer circuitry which provides an interrupt signal to a microprocessor of the computer when a change of switch device position is detected.

12. The apparatus of claim 1 wherein the switch device comprises
    an electromechanical switch device having at least two positions, and
    instructions in the computer boot sequence which, during boot-up, detect the current position of the electromechanical switch device and trigger a corresponding one of at least two different boot-up routines depending upon the current position of the switch device.

13. The apparatus of claim 1 wherein the apparatus further comprises a windowed operating system in which available applications are represented by displayed icons, and the two different interactive modes are represented by two different sets of displayed icons.

14. The apparatus of claim 1 wherein the switch device and access control device are housed in a unit that connects to a communication port of the computer.

\* \* \* \* \*

UNITED STATES PATENT AND TRADEMARK OFFICE
CERTIFICATE OF CORRECTION

| | | |
|---|---|---|
| PATENT NO. | : 6,097,385 | Page 1 of 1 |
| APPLICATION NO. | : 08/724682 | |
| DATED | : August 1, 2000 | |
| INVENTOR(S) | : Tony L. Robinson | |

It is certified that error appears in the above-identified patent and that said Letters Patent is hereby corrected as shown below:

Column 5, Line 19, change claim 1 to read as follows:

--1. An apparatus for operating a computer in any of at least two interactive modes, comprising
a dedicated switch device having at least two states, each of which, when enabled, causes a respective one of the interactive modes to be active, each interactive mode comprising a graphical user interface having graphical elements that respectively represent different applications that may be invoked by a user, and
an access control device which allows a first user to change the state of the dedicated switch device from either of the at least two states to the other state during normal operation to establish a present state of the switch device, and which prevents a second user from changing the present state of the switch device,
wherein a first one of said interactive modes has different display control parameters from a second one of said interactive modes;
wherein said dedicated switch device remains in the same state during computer shut-down or rebooting.--

Signed and Sealed this

Seventeenth Day of July, 2007

JON W. DUDAS
*Director of the United States Patent and Trademark Office*